United States Patent
Poon et al.

(10) Patent No.: US 6,831,383 B2
(45) Date of Patent: Dec. 14, 2004

(54) BLOWER MOTOR

(75) Inventors: Kwong Yip Poon, Hong Kong (CN); Siu Chun Tam, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 10/355,222

(22) Filed: Jan. 31, 2003

(65) Prior Publication Data

US 2003/0151320 A1 Aug. 14, 2003

(30) Foreign Application Priority Data

Feb. 7, 2002 (GB) .............................................. 0202841

(51) Int. Cl.[7] .............................. H02K 5/15; F16J 15/32
(52) U.S. Cl. ........................................ 310/90; 277/559
(58) Field of Search ............................ 310/90, 90.5, 85, 310/88; 384/478, 479, 471, 476, 477, 486–487; 277/430, 559, 560, 561, 562, 573, 572, 551, 568, 576

(56) References Cited

U.S. PATENT DOCUMENTS

| | | | |
|---|---|---|---|
| 4,166,523 A | * | 9/1979 | Fujii et al. ............. 188/322.17 |
| 4,546,985 A | * | 10/1985 | Forch .......................... 277/560 |
| 4,550,920 A | * | 11/1985 | Matsushima ................. 277/559 |
| 4,848,776 A | * | 7/1989 | Winckler ..................... 277/349 |
| 5,186,548 A | * | 2/1993 | Sink ........................... 384/486 |
| 5,403,098 A | * | 4/1995 | Yasui et al. ................. 384/115 |
| 5,765,952 A | * | 6/1998 | Dekker et al. .............. 384/132 |
| 6,177,744 B1 | * | 1/2001 | Subler et al. ................. 310/90 |
| 6,244,408 B1 | * | 6/2001 | Tobayama et al. ..... 192/84.961 |
| 6,566,777 B2 | * | 5/2003 | AbuAkeel ................... 310/209 |
| 6,616,146 B2 | * | 9/2003 | Friend et al. ............... 277/560 |
| 6,676,132 B1 | * | 1/2004 | Takebayashi et al. ....... 277/560 |

FOREIGN PATENT DOCUMENTS

| | | |
|---|---|---|
| EP | 0 420 212 A2 | 4/1991 |
| EP | 0 919 749 A1 | 6/1999 |
| GB | 554331 | 6/1943 |

* cited by examiner

Primary Examiner—Tran Nguyen
(74) Attorney, Agent, or Firm—Birch, Stewart, Kolasch & Birch, LLP

(57) ABSTRACT

An oil seal arrangement for an electric motor, especially a bypass blower motor assembly has an oil seal protecting a shaft bearing 16 and sealing the shaft aperture between a motor part and a blower part. The oil seal 19 has two lips 25, 28 contacting the shaft 15 at two spaced locations forming a grease chamber 26 therebetween. The volume of the grease chamber 26 is enlarged by a groove 27 in the shaft 15 between the lips 25, 28 of the oil seal 19.

4 Claims, 2 Drawing Sheets

BLOWER MOTOR

This invention relates to electric motors and in particular, to a blower motor for use in a bypass or wet-type vacuum cleaner application.

Blower motors in bypass vacuum cleaners have an impeller which moves air from an inlet to an outlet of an impeller housing fitted to the motor without passing through the motor itself. This construction allows the vacuum cleaner to suck up liquids as well as dust and dirt without damaging the electric motor.

The impeller is mounted on a shaft of the motor. The shaft is journalled in a bearing where it passes through an end bracket of the motor housing which also acts as a divider between the motor and the impeller. Unfortunately, the impeller, while moving air through the impeller housing, creates a large air pressure differential across this bearing. This pressure differential can result in leakage of air through the bearing and into the motor housing proper. This has many potential dangers. Moisture laden air may seep into the motor causing electrical short circuits and/or rusting of motor parts. Entrained dust can contaminate the bearings resulting in rapid failure and even if the air is clean, the leakage removes oil and grease from the bearing leading to a dry bearing and premature bearing failure. The use of sealed bearings is not sufficient and the use of secondary oil seals is common. However, the oil seals require lubrication in the form of grease to reduce the wear on the oil seal lips where they contact the shaft. This is especially important for the modern high speed blower motor assemblies. The lips of the oil seal are relatively rigid to withstand the high air pressure differential across the oil seal. This rigidity comes from making the lips thicker and shorter which reduces the available space between the lips for the lubricating grease. Once the grease has been used up, the oil seal quickly wears out, leading to motor failure.

The present invention seeks to overcome this problem by creating a larger grease reservoir between the shaft and the lips of the oil seal. This is achieved by providing a groove in the shaft between the lips of the oil seal.

Accordingly, the present invention provides an electric motor having a rotor including a shaft, a stator, bearings associated with the stator supporting the shaft, and an oil seal associated with one of the bearings, said oil seal contacting the shaft at two axially spaced locations and forming a cavity for lubricating grease, wherein the shaft has a groove located between said spaced locations to increase the volume of the cavity.

Preferred and/or optional features are set forth in the dependent claims.

Figure 1:
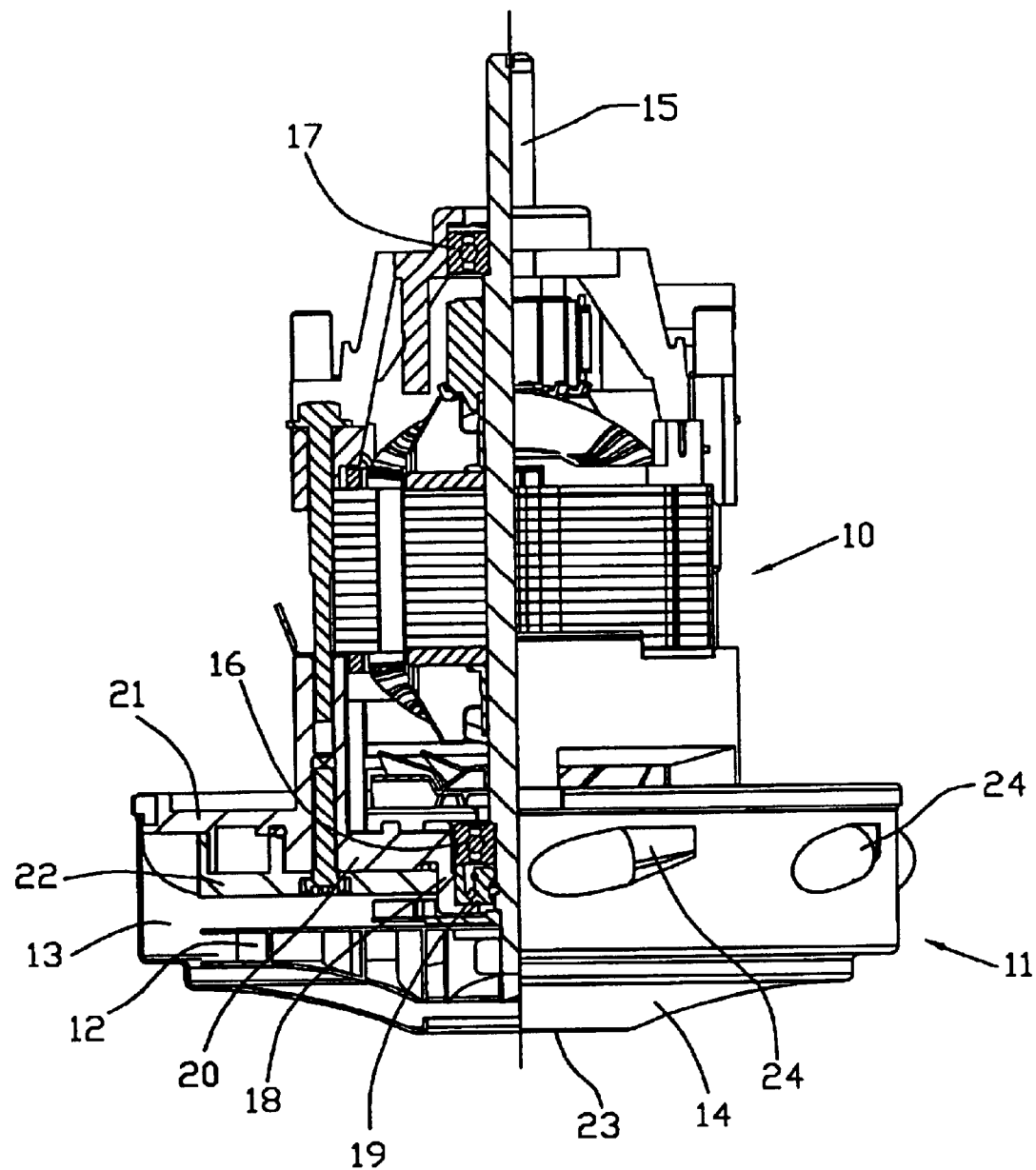
Figure 2:
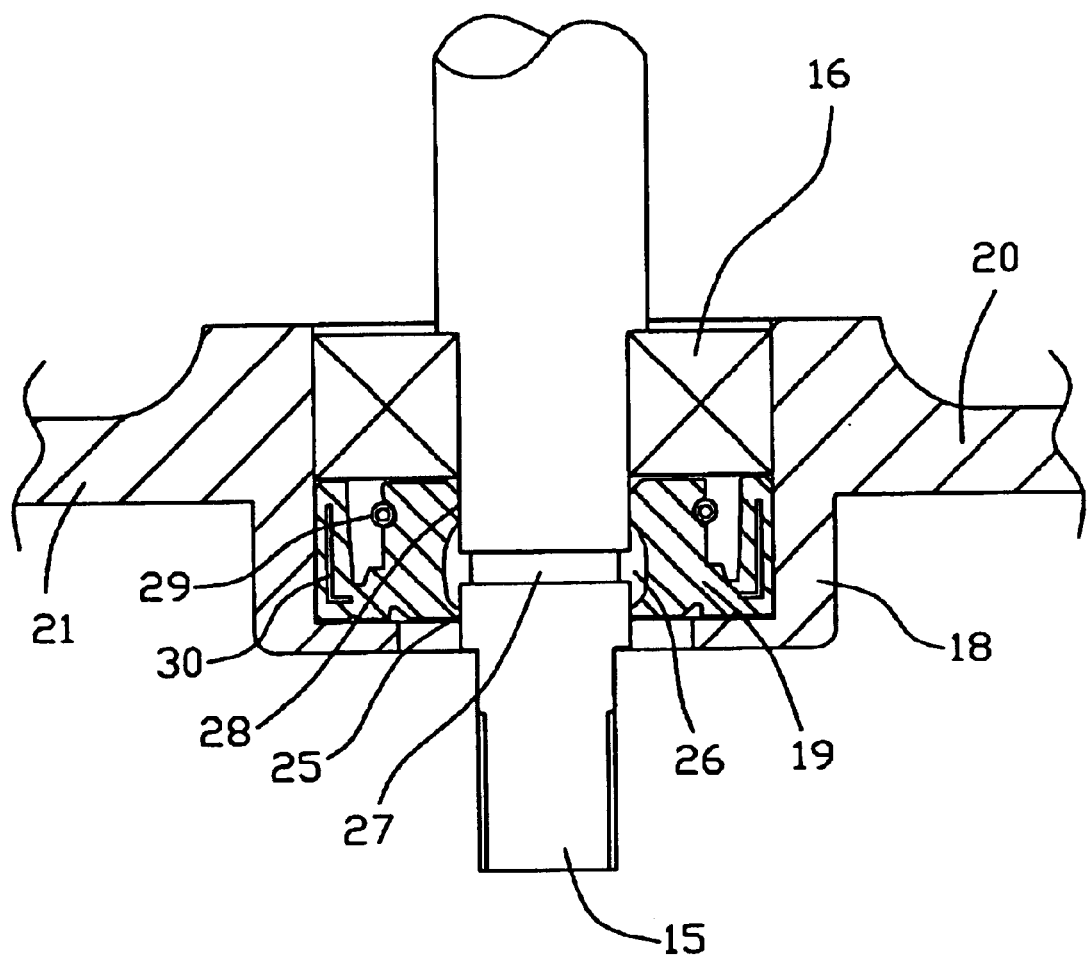

A preferred embodiment of the present invention will now be described, by way of example only, with reference to the accompanying drawings, in which:

FIG. 1 is a part sectional view of a blower motor assembly incorporating an oil seal arrangement according to the present invention; and FIG. 2 is an enlarged detail view of the oil seal arrangement of FIG. 1.

The preferred oil seal arrangement is shown in FIG. 1 incorporated within a bypass blower motor assembly as used, for example, in a wet and dry vacuum cleaner. The motor assembly comprises a universal motor 10 driving a blower 11. The blower 11 comprises a high speed impeller 12 of the centrifugal fan type located within an impeller chamber 13 defined in part by an impeller housing 14.

As the universal motor and the blower are of known construction, details of their construction and operation will not be described in detail here except as required to explain the invention.

The motor 10 has a shaft 15 which is supported in bearings 16 and 17. Bearing 16, located adjacent the impeller chamber is housed in a boss 18 formed in a fan end bracket 20. Bracket 20 has a generally radially extending flange 21 to which the impeller housing 14 is secured. A diffuser plate 22 is disposed on the fan end bracket 20 to direct air flow from the inlet 23 to the outlet openings 24 of the impeller housing 14. Thus, the fan end bracket 20 and the diffuser plate 22 along with the impeller housing 14 define the impeller chamber 13. The fan end bracket 20 also isolates the motor proper 10 from the blower 11.

The motor shaft 15 extends through the fan end bracket 20 into the impeller chamber 13 where it engages the impeller 12. The shaft 15 is rotatably supported by the bearing 16 which is a sealed ball bearing and located within a boss 18 of the end bracket 20. An oil seal 19 is also located in the bearing boss 18. The oil seal 19 seals the gap between the shaft 15 and the bracket 20.

The oil seal 19 and bearing 16 are shown enlarged in FIG. 2. The oil seal 19 is a standard nitrile rubber annular ring seal with a steel ring insert 30 allowing a sealing press fit within the boss 18. The seal 19 also has two annular radially inwardly directed lips 25, 28 which sealingly engage the shaft 15 at axially spaced locations. Lip 25 provides a first auxiliary seal against the shaft. Lip 25 provides the primary sealing function and is urged into sealing contact with the shaft by an annular helical spring 29. Between the lips 25, 28 is an annular space 26 which, in use, is filled with grease to lubricate the seal between the lips 25, 28 and the shaft 15. An annular groove 27 is formed in the shaft 15 between the axially spaced locations contacted by the lips 25, 28 to increase the volume of the space 26 so as to hold more grease, thus increasing the life of the oil seal and thus the life of the blower motor assembly.

The embodiment described above is given by way of example only and various modifications will be apparent to persons skilled in the art without departing from the scope of the invention as defined in the appended claims.

What is claimed is:

1. An electric motor having a rotor including a shaft, a stator, bearings associated with the stator supporting the shaft, and an oil seal associated with one of the bearings, said oil seal contacting the shaft at two axially spaced locations and forming a cavity for filling with lubricating grease, wherein the shaft has a groove located between said spaced locations to increase the volume of the cavity and the amount of lubricating grease.

2. The electric motor of claim 1, wherein the groove in the shaft is circumferential.

3. The electric motor of claim 1 wherein the oil seal is of nitrile rubber having two inwardly extending lips which make circumferential contact with the shaft at the two axially spaced locations.

4. The electric motor of claim 3 wherein the cavity is an annular spaced formed between the shaft and the two lips of the oil seal.

* * * * *